1,815,270

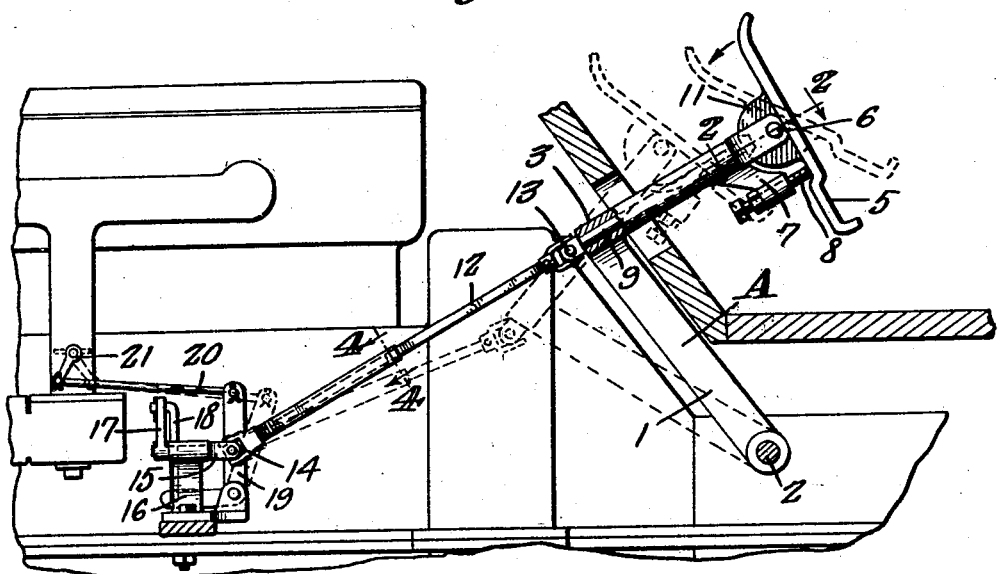
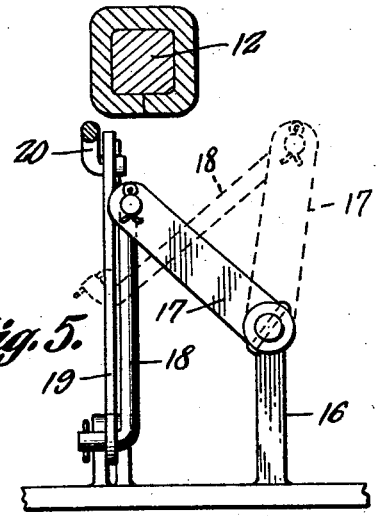
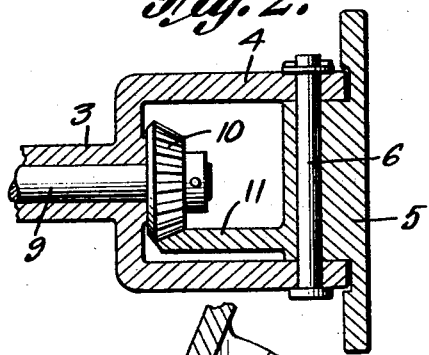
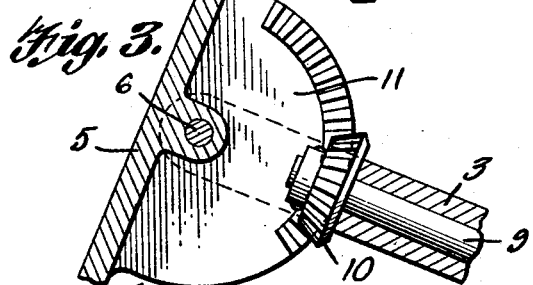
Anson E. Rector, INVENTOR
BY Victor J. Evans, ATTORNEY Patented July 21, 1931

UNITED STATES PATENT OFFICE

ANSON E. RECTOR, OF SAVANNAH, NEW YORK

COMBINATION BRAKE AND ACCELERATOR

Application filed November 25, 1929. Serial No. 409,622.

This invention relates to improvements in motor vehicles, the general object of the invention being to provide a combined brake and accelerator so that one foot of the operator can control the flow of gas to the engine and the application of the brakes without moving the foot from one part to another, thus enabling the operator to more quickly stop the vehicle, facilitating backing of the vehicle, rendering it easy to start the vehicle when stopped on a hill and otherwise giving the operator perfect control of the vehicle.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a fragmentary sectional view through part of a motor vehicle, showing the invention in use.

Figure 2 is a section on line 2—2 of Figure 1.

Figure 3 is a sectional view through Figure 2.

Figure 4 is a section on line 4—4 of Figure 1.

Figure 5 is a detail view, partly in section, showing the connections between the telescopic shaft and the carbureter valve.

In these drawings, the letter A indicates the brake pedal, which consists of the part 1 which is connected with the shaft 2 and the part 3 which passes through a hole in the floor board, this part 3 being of tubular construction and having its upper or inner end of forked construction, as shown at 4. The foot part 5 is pivoted between the prongs of the fork by the pin 6 and this foot part is formed with a recess in its lower part to receive the heel of the foot resting on said part and its upper end is curved so that it can be readily pressed forwardly by the toe of the foot. An arm 7 is formed on the part 3 and carries a set screw 8 which acts as an adjustable stop for limiting the downward movement of the foot plate 5. A shaft 9 passes through the tubular part 3 and has a pinion 10 fastened to its upper end, this pinion being located between the prongs of the fork and meshes with a segmental gear 11 connected with the foot plate. Thus as the foot plate is rocked on its pivot, the shaft 9 will be partly rotated through means of the gears 10 and 11. A telescopic shaft 12 is connected with the front end of the shaft 9 by a universal joint 13 and the other end of the shaft 12 is connected by a universal joint 14 with a stub shaft 15 journaled in a post 16 suitably supported adjacent the engine of the vehicle. An arm 17 is connected with the forward end of the stub shaft and a link 18 connects this arm with one end of a bell crank 19 pivoted to a part of the post 16. A link 20 connects the other end of the bell crank with the arm of the butterfly valve 21 of the carbureter.

From the foregoing it will be seen that by placing the foot on the foot plate 5 with the heel in the recess at the bottom of the plate, the operator can readily press the pedal downwardly in the usual manner so as to apply the brakes. It will also be seen that by pressing downwardly with the toe of the foot, the foot plate will be rocked on its pivot so that the shaft 9 will be partly rotated by the gears 10 and 11 and this movement will be communicated to the telescopic shaft which in turn partly rotates the shaft 15 and thus the carbureter valve will be opened or partly so through the connections between the shaft 15 and the arm of the valve. Thus the flow of gas to the engine is controlled by the same foot which rests on the brake pedal and without moving the foot from one part to another. By providing the telescopic shaft, the parts of which are of square shape in cross section, the pedal can be depressed without interference on the parts of the device and the universal joints also facilitate the movement of the pedal to braking position without interference to such movement and without interfering with the action of the accelerator. As before stated, this invention gives the operator perfect control of the vehicle as he can apply the brakes and control the flow of gas to the engine without moving his foot from one part to another. Thus the operator can stop his car much quicker than he could if he had to move his foot from the accelerator to the brake pedal. It also enables a car to be readily started on a hill and facilitates backing, as the operator can turn his head to see where he is backing and is not required to glance forwardly in order to shift his foot from the accelerator to the pedal and vice versa.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

In a motor vehicle, a brake pedal having a tubular part passing through the floor boards, a tiltable foot plate on the rear end of said part, a shaft passing through the tubular part, means for imparting rotary movement to the shaft by the tilting of the foot plate, a telescopic shaft of non-circular shape in cross section, a universal joint connecting the front end of the shaft to the first shaft, a stub shaft, a universal joint connecting the rear end of the telescopic shaft to the stub shaft and means for operating a carbureter valve by the rocking movement of the stub shaft.

In testimony whereof I affix my signature.

ANSON E. RECTOR.